(12) United States Patent
Kwon et al.

(10) Patent No.: US 10,182,531 B2
(45) Date of Patent: Jan. 22, 2019

(54) CONTINUOUS CULTIVATION SYSTEM FOR ORGANIC GINSENG USING MULTILEVEL CULTIVATION TABLES

(71) Applicant: KYONGSANGBUK-DO AGRICULTURAL TECHNOLOGY ADMINISTRATION, Daegu (KR)

(72) Inventors: Tae Ryong Kwon, Andong-si (KR); Myeong Hwan Jang, Yeongju-si (KR); Jin Kook Choi, Yeongju-si (KR); Deok Jong Ahn, Yeongju-si (KR); Won Kwon Jung, Yeongju-si (KR)

(73) Assignee: KYONGSANGBUK-DO AGRICULTURAL TECHNOLOGY ADMINISTRATION, Daegu (KR)

( * ) Notice: Subject to any disclaimer, the term of this patent is extended or adjusted under 35 U.S.C. 154(b) by 728 days.

(21) Appl. No.: 14/415,966

(22) PCT Filed: Sep. 16, 2013

(86) PCT No.: PCT/KR2013/008351
§ 371 (c)(1),
(2) Date: Jan. 20, 2015

(87) PCT Pub. No.: WO2014/046433
PCT Pub. Date: Mar. 27, 2014

(65) Prior Publication Data
US 2015/0208594 A1    Jul. 30, 2015

(30) Foreign Application Priority Data
Sep. 21, 2012 (KR) .................. 10-2012-0105150

(51) Int. Cl.
*A01G 9/14* (2006.01)
*A01G 9/20* (2006.01)
*A01G 9/24* (2006.01)

(52) U.S. Cl.
CPC .............. *A01G 9/14* (2013.01); *A01G 9/1423* (2013.01); *A01G 9/20* (2013.01); *A01G 9/247* (2013.01); *Y02A 40/252* (2018.01)

(58) Field of Classification Search
CPC .......... A01G 1/001; A01G 11/00; A01G 9/00; A01G 9/14; A01G 9/1407; A01G 9/1438;
(Continued)

(56) References Cited

U.S. PATENT DOCUMENTS

| | | | | |
|---|---|---|---|---|
| 640,957 A | * | 1/1900 | Sattler | A01G 9/241 126/59.5 |
| 1,526,766 A | * | 2/1925 | Ward | A01G 9/14 119/448 |

(Continued)

FOREIGN PATENT DOCUMENTS

| | | |
|---|---|---|
| KR | 20-174607 Y1 | 3/2000 |
| KR | 10-2001-0061243 A | 7/2001 |

(Continued)

OTHER PUBLICATIONS

International Searching Authority, International Search Report for PCT/KR2013/008351 dated Nov. 28, 2013.

*Primary Examiner* — Monica L Williams
*Assistant Examiner* — Michael A. Fabula
(74) *Attorney, Agent, or Firm* — Sughrue Mion, PLLC

(57) ABSTRACT

A continuous cultivation system for growing an organic ginseng using multilevel cultivation tables. The system includes a facility including: a rainproof plastic roof, a first sun-shading screen placed on the rainproof plastic roof and allows transmission of an adequate amount of sunlight for cultivation of ginseng, and a second sun-shading screen installed at front, back, and left, and right sides of the facility and that allows air to smoothly pass therethrough; a plurality of multilevel cultivation tables that includes three or more levels of cultivation tables respectively; a water supply (Continued)

device for uniformly supplying water to the cultivation tables; a ventilation window and an air blowing fan installed on a ceiling of the facility to ventilate an upper portion of the facility; and auxiliary light sources installed under all of the cultivation tables except for lowermost cultivation tables.

4 Claims, 11 Drawing Sheets

(58) Field of Classification Search
CPC ........ A01G 9/1423; A01G 9/22; A01G 9/222;
A01G 9/227; A01G 9/20; A01G 9/24;
A01G 9/241; A01G 9/242; A01G 9/247;
A01G 9/02; A01G 9/023; A01M 21/00
See application file for complete search history.

(56) References Cited

U.S. PATENT DOCUMENTS

| | | | | |
|---|---|---|---|---|
| 2,031,157 | A * | 2/1936 | Gilson | A01G 9/227 160/120 |
| 2,051,643 | A * | 8/1936 | Morrison | A01G 9/1407 112/417 |
| 2,122,005 | A * | 6/1938 | Foley, Jr. | A01G 9/14 52/644 |
| 2,143,659 | A * | 1/1939 | Morrison | A01G 9/1407 112/417 |
| 2,150,257 | A * | 3/1939 | Winandy | A01G 9/1423 47/18 |
| 2,200,706 | A * | 5/1940 | Slater, Jr. | A01G 9/14 52/79.9 |
| 2,206,478 | A * | 7/1940 | Hennessey | A01G 9/24 49/371 |
| 2,350,721 | A * | 6/1944 | Brown | A01G 11/00 239/565 |
| 2,524,246 | A * | 10/1950 | Young | A01G 9/1423 217/3 R |
| 2,545,717 | A * | 3/1951 | Voigt | A01G 9/1423 47/18 |
| 2,601,326 | A * | 6/1952 | Rohs | A01G 9/1438 139/426 R |
| RE23,603 | E * | 12/1952 | Rohs et al. | A01G 9/1438 139/383 R |
| 2,816,329 | A * | 12/1957 | Sogaro | A01G 9/14 52/199 |
| 2,855,725 | A * | 10/1958 | Carothers | A01G 9/247 137/412 |
| 3,028,872 | A * | 4/1962 | Cresswell | A01G 9/1407 135/122 |
| 3,299,589 | A * | 1/1967 | Hay | A01G 9/24 126/621 |
| 3,343,300 | A * | 9/1967 | Englert | A01G 9/00 47/17 |
| 3,365,840 | A * | 1/1968 | Cooper | A01G 11/00 47/59 R |
| 3,824,736 | A * | 7/1974 | Davis | A01G 7/045 47/17 |
| 4,055,030 | A * | 10/1977 | Earnshaw | A01G 9/14 135/905 |
| 4,062,146 | A * | 12/1977 | Grossman | A01G 9/22 135/90 |
| 4,064,648 | A * | 12/1977 | Cary | A01G 9/227 16/87 R |
| 4,211,036 | A * | 7/1980 | Dalitz | A01G 9/02 206/524.3 |
| 4,305,235 | A * | 12/1981 | Roston | A01G 9/22 126/621 |
| 4,316,405 | A * | 2/1982 | Esposito | A01G 9/24 454/253 |
| 4,387,533 | A * | 6/1983 | Green | A01G 9/22 47/17 |
| 4,514,929 | A * | 5/1985 | Lestraden | A01G 9/24 47/17 |
| 4,527,544 | A * | 7/1985 | Wolf | A01G 9/222 126/605 |
| 4,555,865 | A * | 12/1985 | di Monteforte | A01G 9/22 47/17 |
| 4,557,310 | A * | 12/1985 | Castellaw | A01G 9/22 16/102 |
| 4,577,436 | A * | 3/1986 | Dalle | A01G 9/22 47/17 |
| 4,601,136 | A * | 7/1986 | Watanabe | A01G 9/14 135/93 |
| 4,800,674 | A * | 1/1989 | Sprung | A01G 9/14 47/17 |
| 4,856,228 | A * | 8/1989 | Robinson, Sr. | A01G 9/1407 47/29.1 |
| 4,945,821 | A * | 8/1990 | Holmberg | A01G 9/241 454/250 |
| 4,956,936 | A * | 9/1990 | Sprung | A01G 9/247 47/17 |
| 4,979,551 | A * | 12/1990 | Schon | A01G 9/22 160/134 |
| 4,996,791 | A * | 3/1991 | Sprung | A01G 9/14 47/17 |
| 5,001,859 | A * | 3/1991 | Sprung | A01G 9/1438 47/17 |
| RE33,746 | E * | 11/1991 | Lucas | A01G 9/247 239/195 |
| 5,188,288 | A * | 2/1993 | DeMerritt | A01G 9/245 126/91 A |
| 5,212,903 | A * | 5/1993 | Talbott | A01G 9/242 239/242 |
| 5,400,544 | A * | 3/1995 | Wien | A01G 9/00 47/19.1 |
| 5,428,922 | A * | 7/1995 | Johnson | A01G 9/023 47/62 R |
| 5,564,234 | A * | 10/1996 | Vermeulen | A01G 9/242 135/115 |
| 5,655,335 | A * | 8/1997 | Vermeer | A01G 9/14 47/17 |
| 5,713,154 | A * | 2/1998 | Goldstein | A01G 9/18 47/17 |
| 6,182,737 | B1 * | 2/2001 | Kuwabara | A01G 9/242 160/84.02 |
| 6,260,308 | B1 * | 7/2001 | Looney | A01G 9/227 52/63 |
| 6,282,834 | B1 * | 9/2001 | Mossey | A01G 9/1438 47/17 |
| 2003/0070353 | A1 * | 4/2003 | Mercurio | A01G 9/242 47/17 |
| 2003/0154652 | A1 * | 8/2003 | Dramm | A01G 9/247 47/48.5 |
| 2003/0159364 | A1 * | 8/2003 | Piano | A01G 9/14 52/3 |
| 2005/0005528 | A1 * | 1/2005 | Brault | A01G 9/14 52/63 |
| 2005/0005529 | A1 * | 1/2005 | Brault | A01G 7/045 52/63 |
| 2005/0120625 | A1 * | 6/2005 | Appel | A01G 9/023 47/65.6 |
| 2005/0204621 | A1 * | 9/2005 | Garrison | A01G 9/02 47/66.1 |
| 2005/0241779 | A1 * | 11/2005 | Abouloukme | A01G 9/227 160/122 |
| 2006/0032115 | A1 * | 2/2006 | Van Den Dool | A01G 7/045 47/17 |
| 2006/0162253 | A1 * | 7/2006 | Nilsson | A01G 9/247 47/79 |
| 2007/0051054 | A1 * | 3/2007 | Devincenzo | A01G 9/16 52/72 |
| 2007/0157529 | A1 * | 7/2007 | Kawanaka | A01G 9/14 52/79.5 |
| 2007/0214714 | A1 * | 9/2007 | Harnois | A01G 9/14 47/17 |
| 2007/0289213 | A1 * | 12/2007 | Van Geest | A01G 9/247 47/62 C |
| 2008/0000151 | A1 * | 1/2008 | Houweling | A01G 9/14 47/17 |

(56) References Cited

U.S. PATENT DOCUMENTS

| | | | | |
|---|---|---|---|---|
| 2008/0172935 A1* | 7/2008 | Feng | ............... | A01G 9/22 47/17 |
| 2008/0256854 A1* | 10/2008 | McIlvenna | ............... | A01G 9/16 47/29.5 |
| 2008/0276527 A1* | 11/2008 | Huang | ............... | A01G 9/20 47/65.5 |
| 2009/0071091 A1* | 3/2009 | Ode | ............... | A01G 9/14 52/653.1 |
| 2009/0183425 A1* | 7/2009 | Zimhoni | ............... | A01G 9/14 47/17 |
| 2010/0275512 A1* | 11/2010 | Nien | ............... | A01G 9/16 47/66.7 |
| 2011/0041397 A1* | 2/2011 | Kamahara | ............... | A01G 9/14 47/17 |
| 2011/0192082 A1* | 8/2011 | Uchiyama | ............... | A01G 9/24 47/66.6 |
| 2011/0247268 A1* | 10/2011 | Adams | ............... | A01G 9/02 47/66.1 |
| 2011/0252705 A1* | 10/2011 | Van Gemert | ............... | A01G 7/02 47/66.7 |
| 2011/0302838 A1* | 12/2011 | Chen | ............... | A01G 7/045 47/65.9 |
| 2012/0000121 A1* | 1/2012 | Swann | ............... | A01G 9/14 47/17 |
| 2012/0054061 A1* | 3/2012 | Fok | ............... | A01G 31/00 705/26.5 |
| 2012/0198766 A1* | 8/2012 | DeBolt | ............... | A01G 9/14 47/66.7 |
| 2012/0210637 A1* | 8/2012 | Kamahara | ............... | A01G 7/045 47/17 |
| 2013/0104452 A1* | 5/2013 | Hassle | ............... | A01G 9/14 47/17 |
| 2013/0152462 A1* | 6/2013 | Wang | ............... | A01G 9/14 47/17 |
| 2013/0239488 A1* | 9/2013 | Thery | ............... | A01G 9/14 52/86 |
| 2013/0247462 A1* | 9/2013 | Leslie | ............... | A01G 9/247 47/82 |
| 2013/0255146 A1* | 10/2013 | Lehman | ............... | A01G 31/00 47/17 |
| 2013/0305601 A1* | 11/2013 | Park | ............... | A01G 31/04 47/17 |
| 2014/0017043 A1* | 1/2014 | Hirai | ............... | A01G 31/02 414/267 |
| 2014/0020292 A1* | 1/2014 | McNamara | ............... | A01G 9/16 47/66.6 |
| 2014/0083000 A1* | 3/2014 | DeMerchant, Jr. | ............... | A01G 9/14 47/17 |
| 2014/0157662 A1* | 6/2014 | Wallace | ............... | A01G 9/14 47/17 |

FOREIGN PATENT DOCUMENTS

| | | |
|---|---|---|
| KR | 10-2006-0001846 A | 1/2006 |
| KR | 10-0958847 B1 | 6/2010 |
| KR | 10-2011-0079496 A | 7/2011 |
| KR | 10-2012-0103227 A | 9/2012 |

* cited by examiner

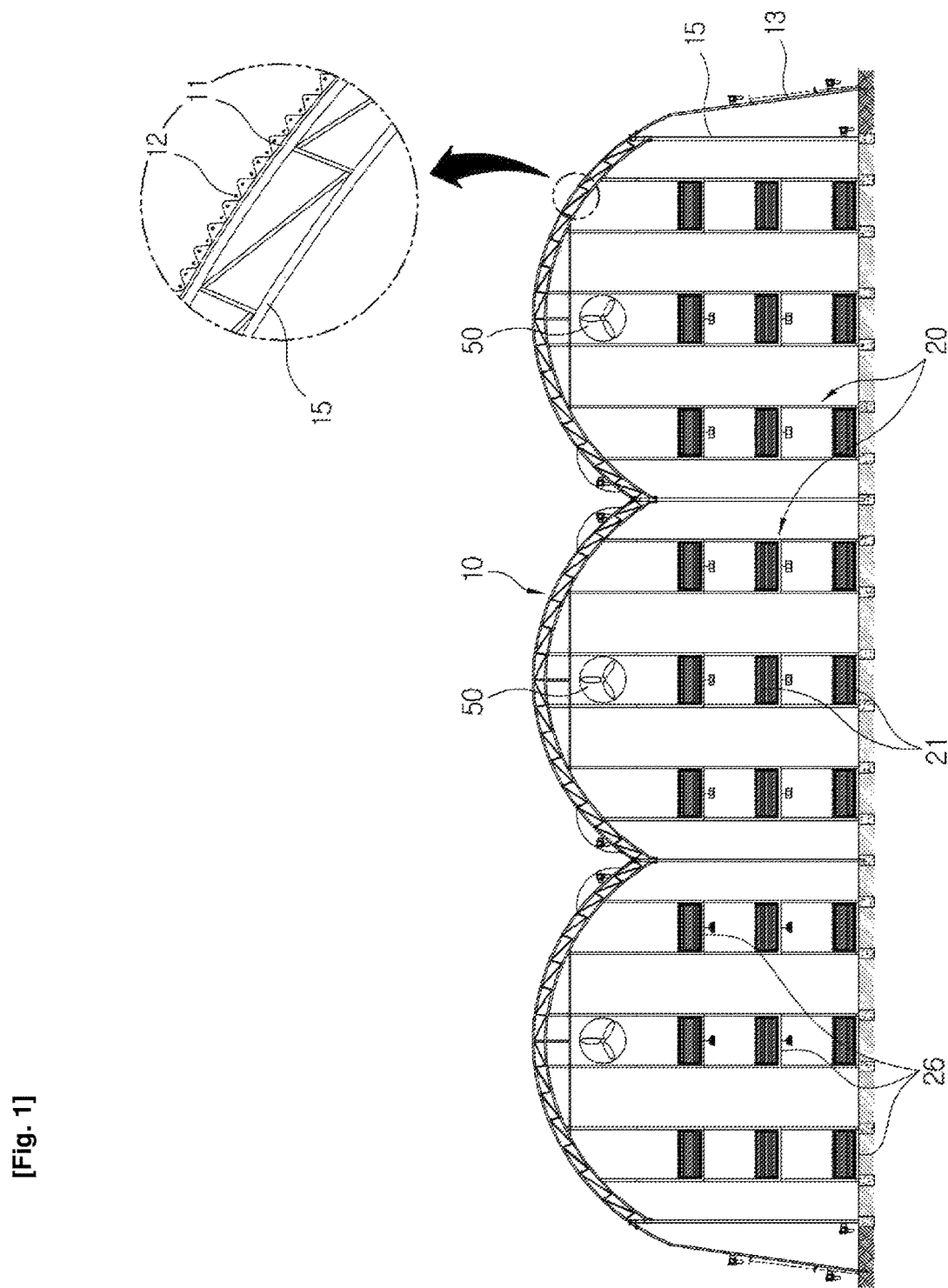
[Fig. 1]

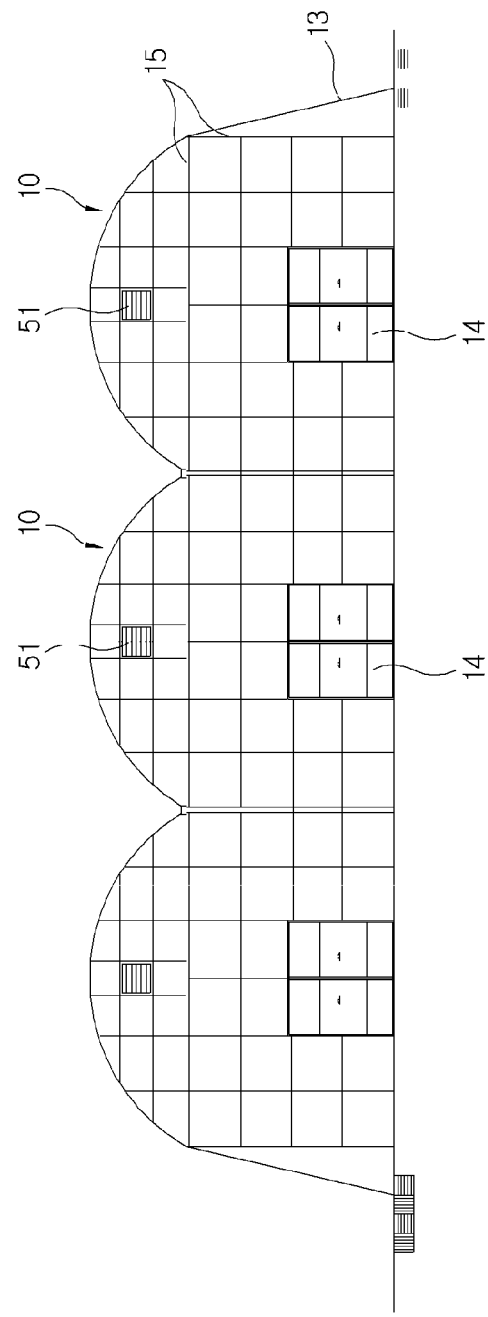

[Fig. 3]
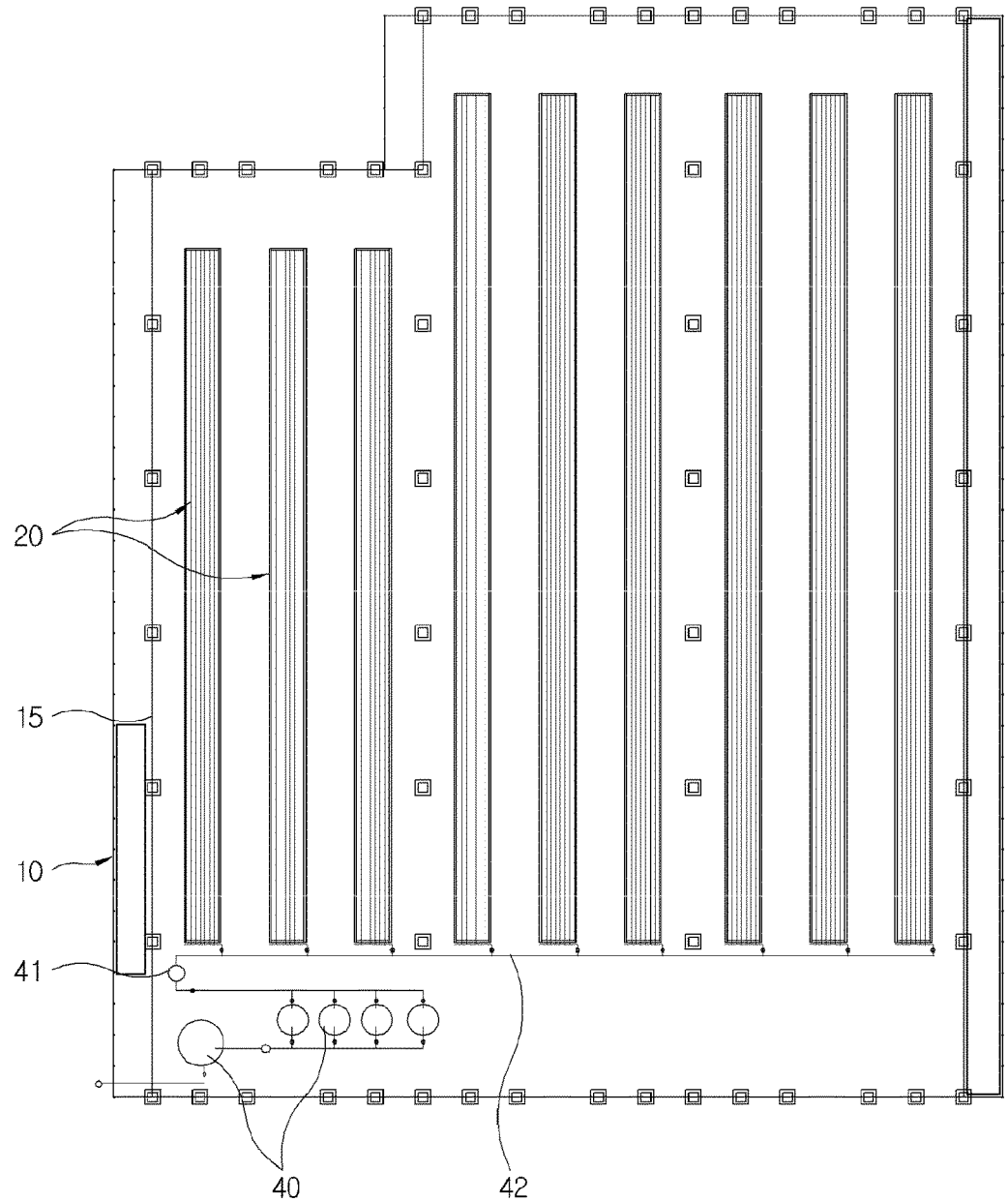

[Fig. 4]
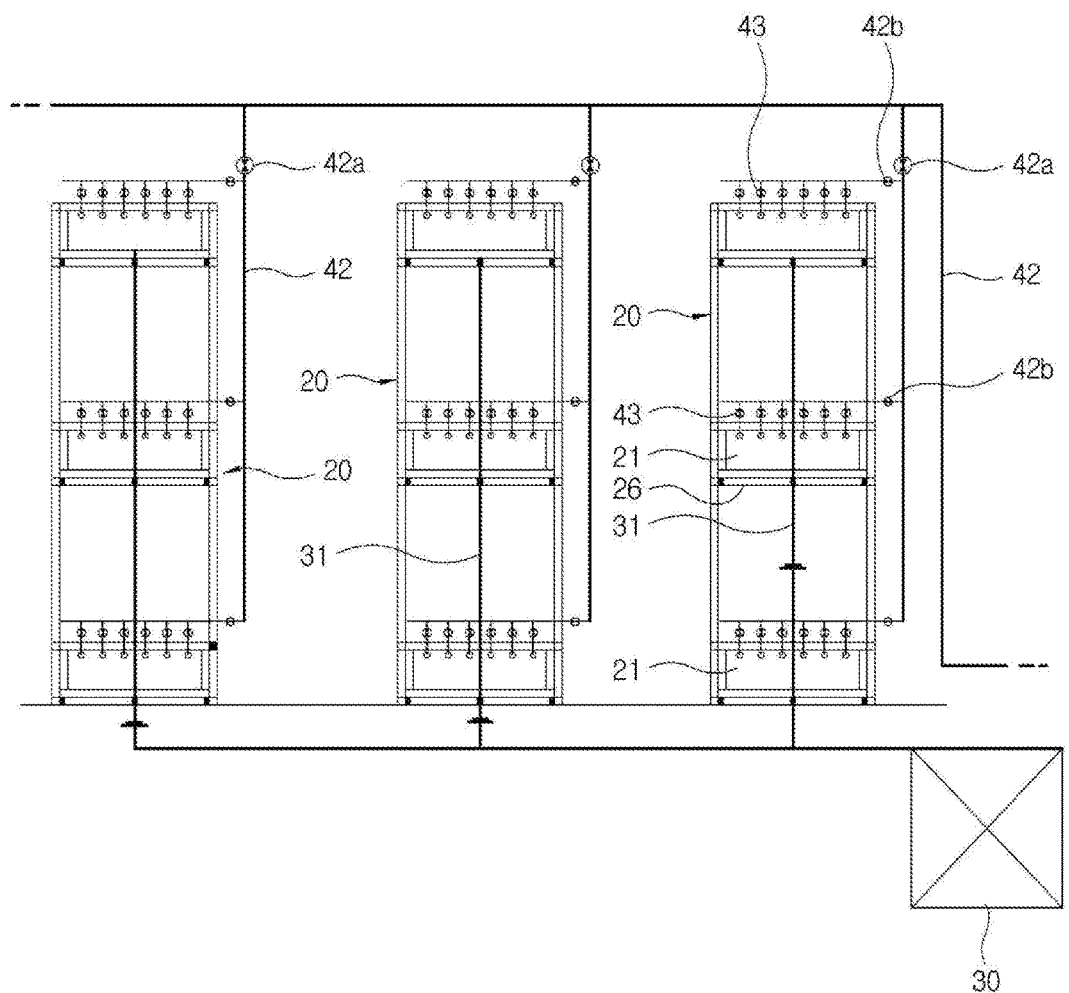

[Fig. 5]
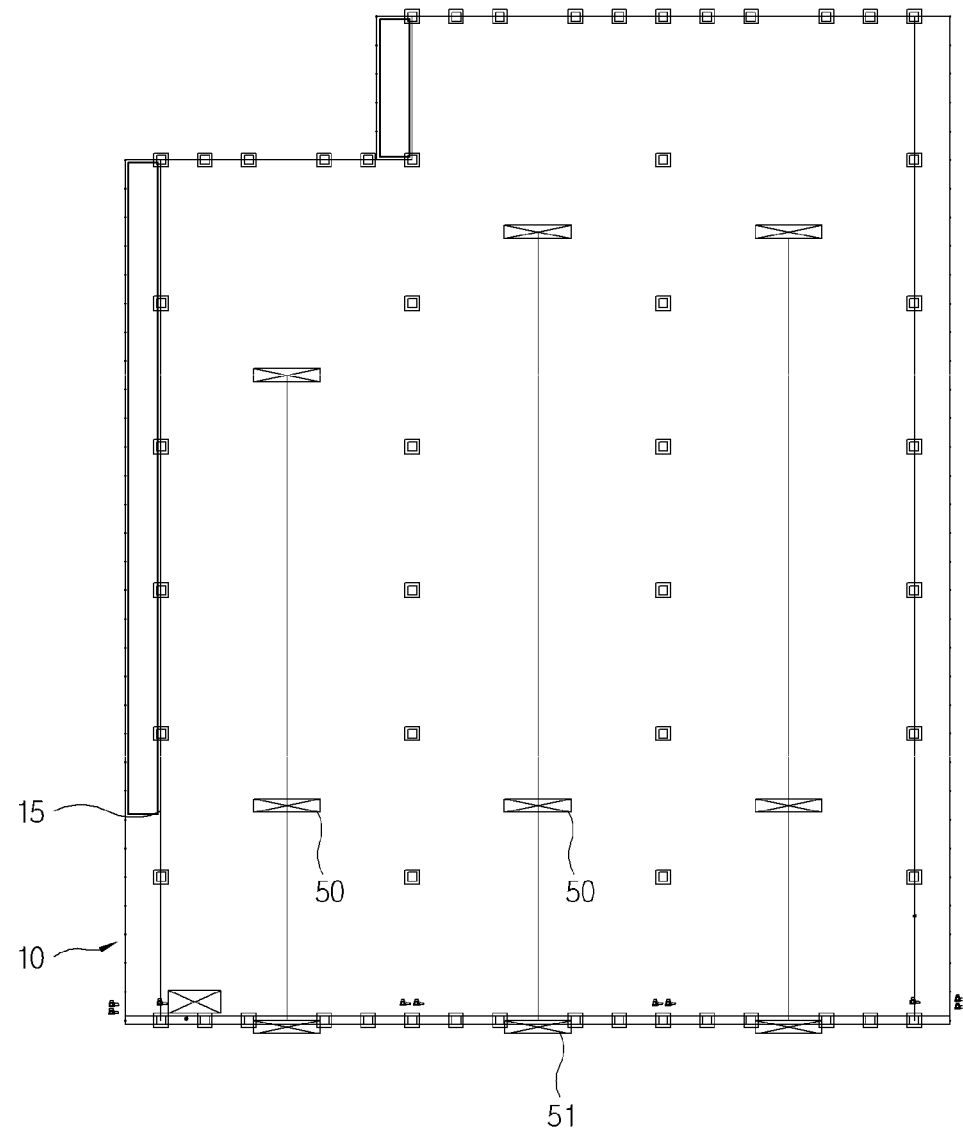

【Fig.6】
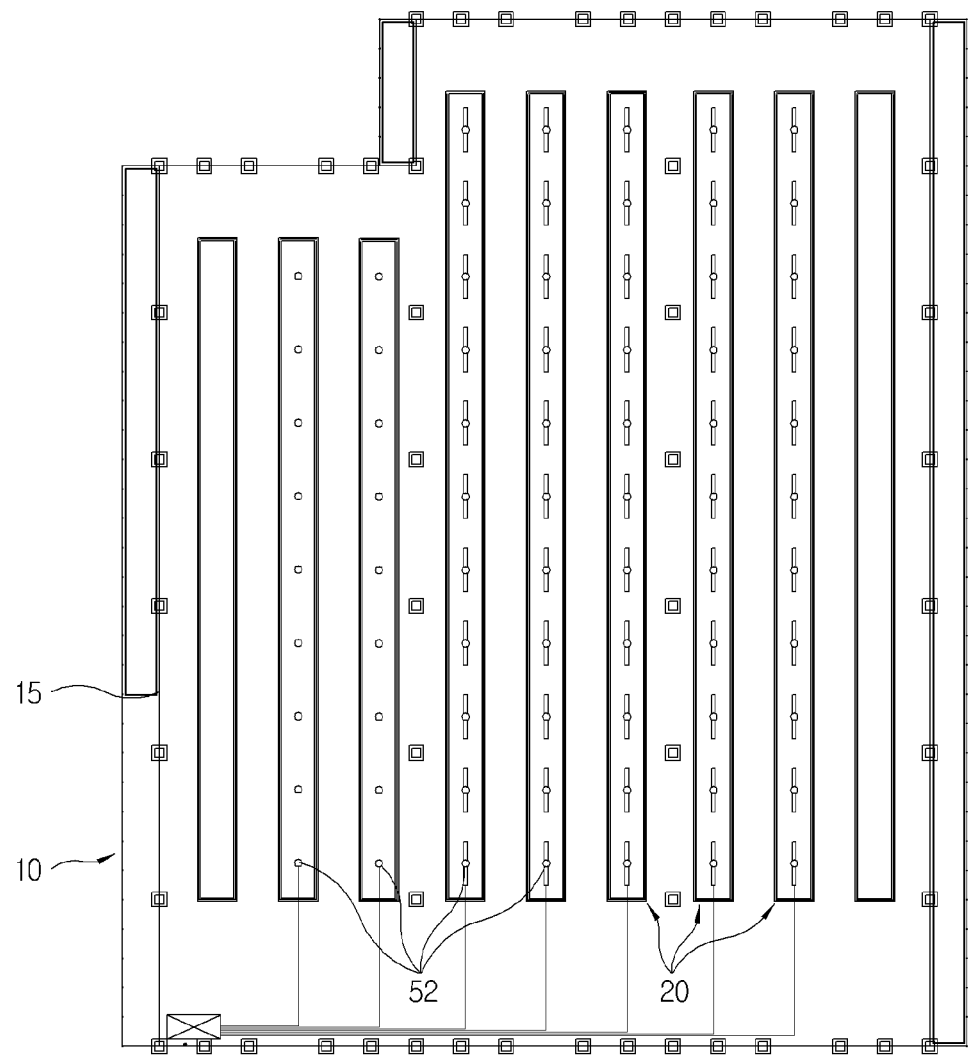

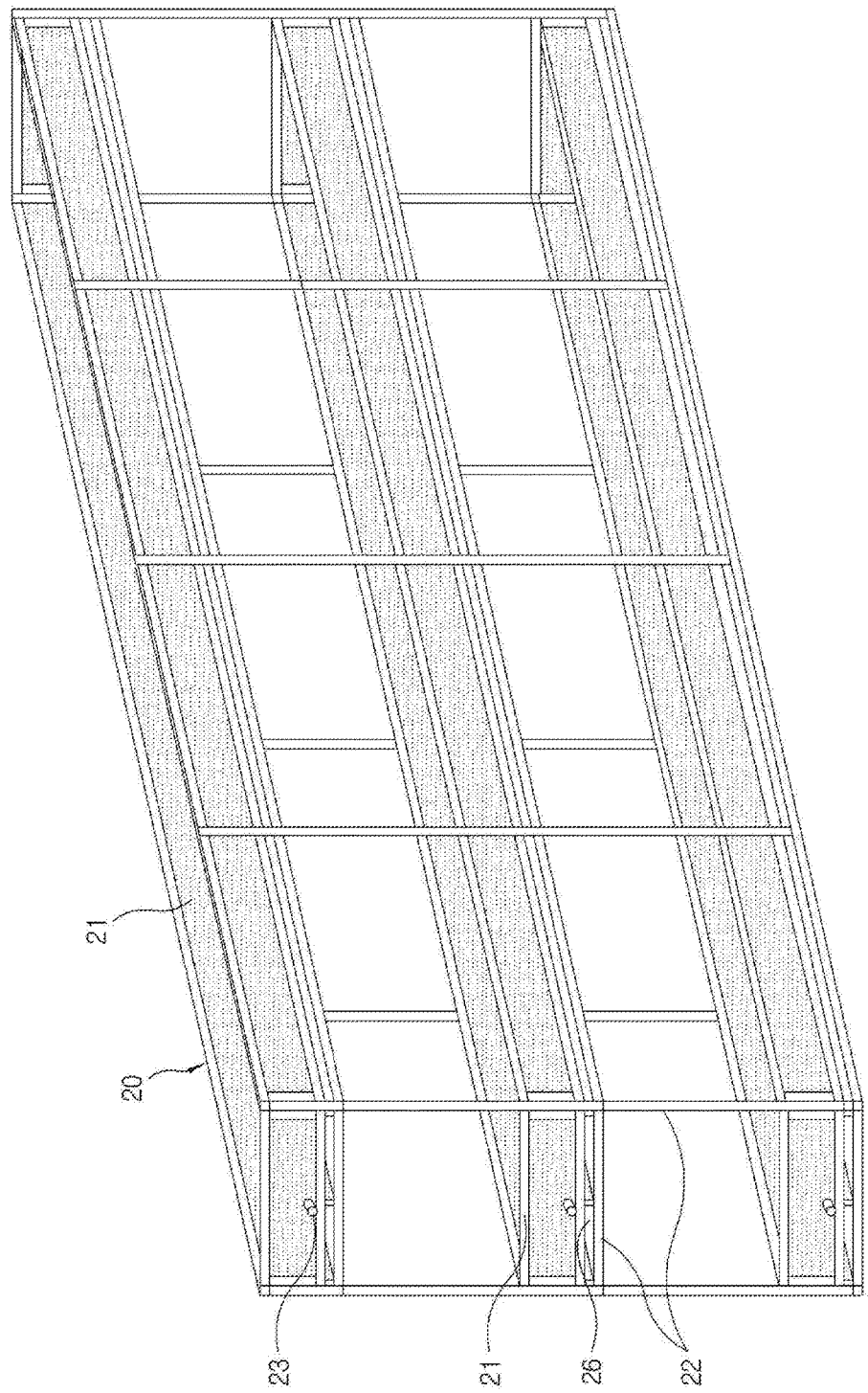
[Fig. 7]

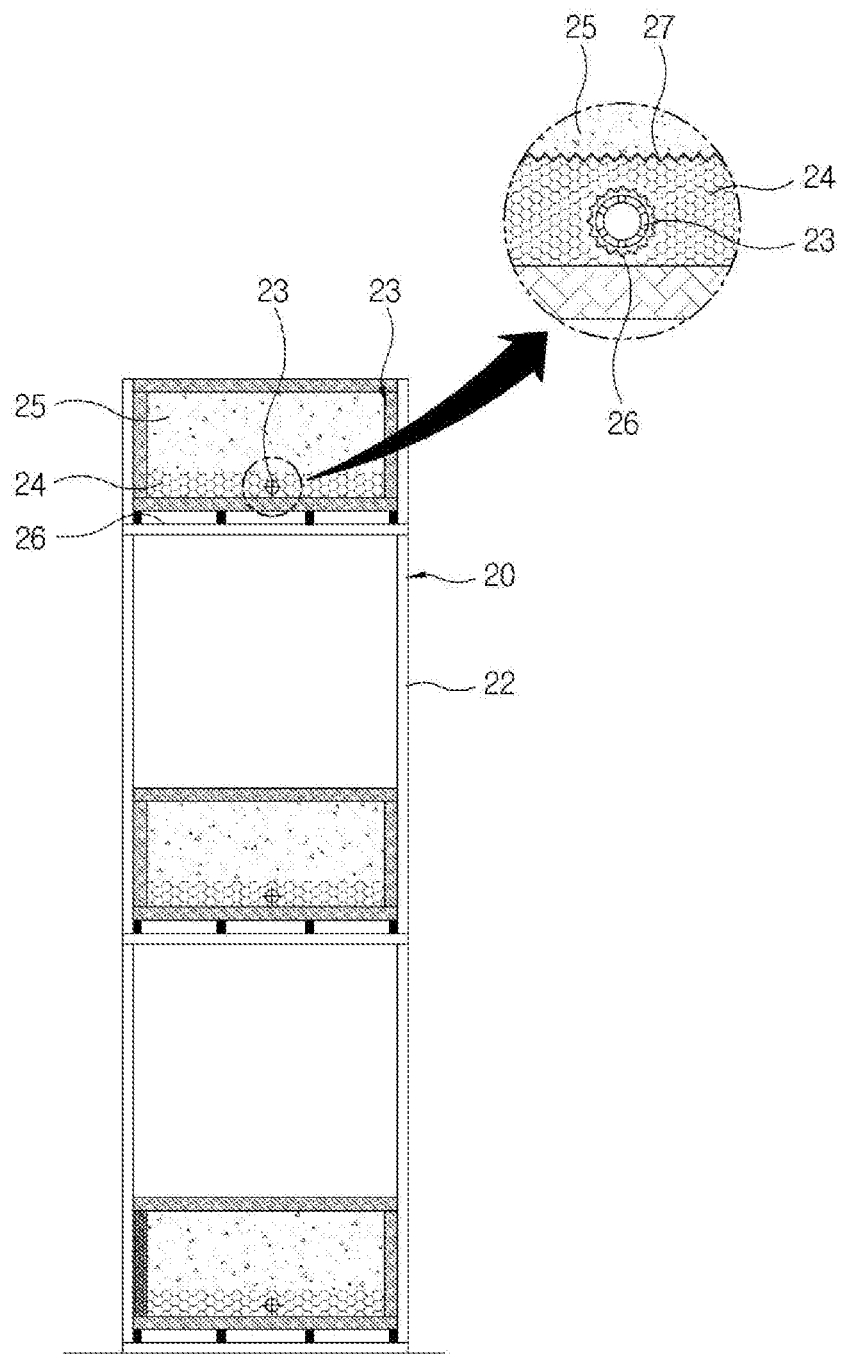
[Fig. 8]

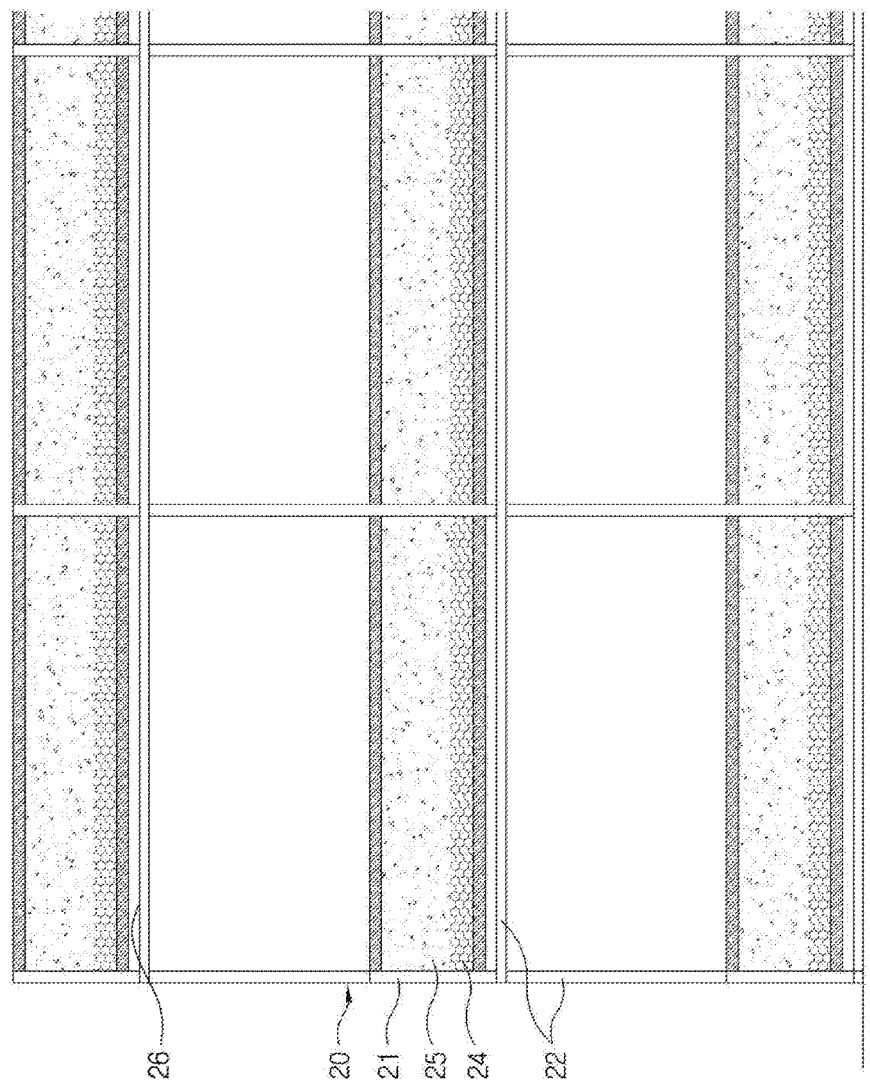
[Fig. 9]

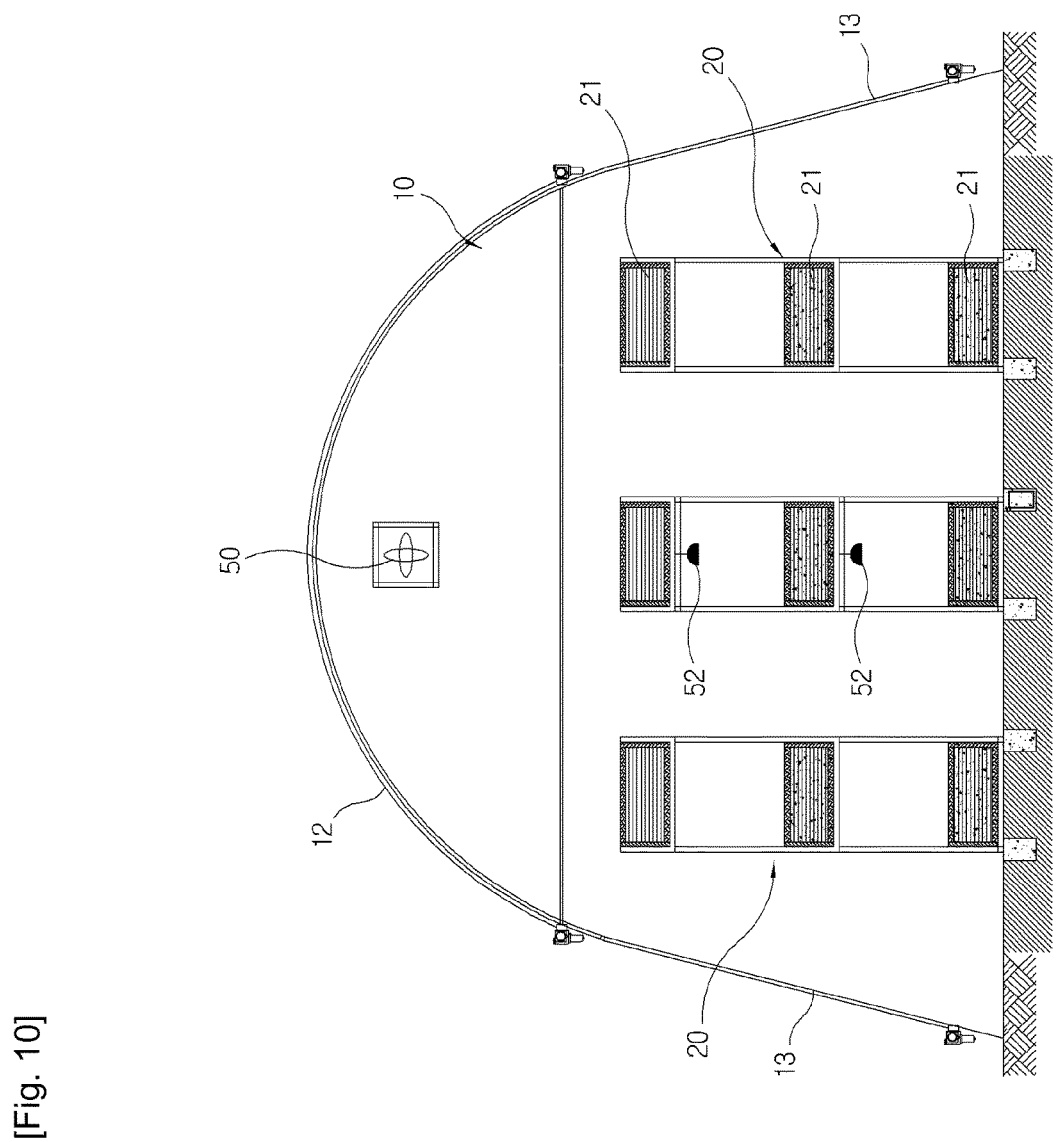
[Fig. 10]

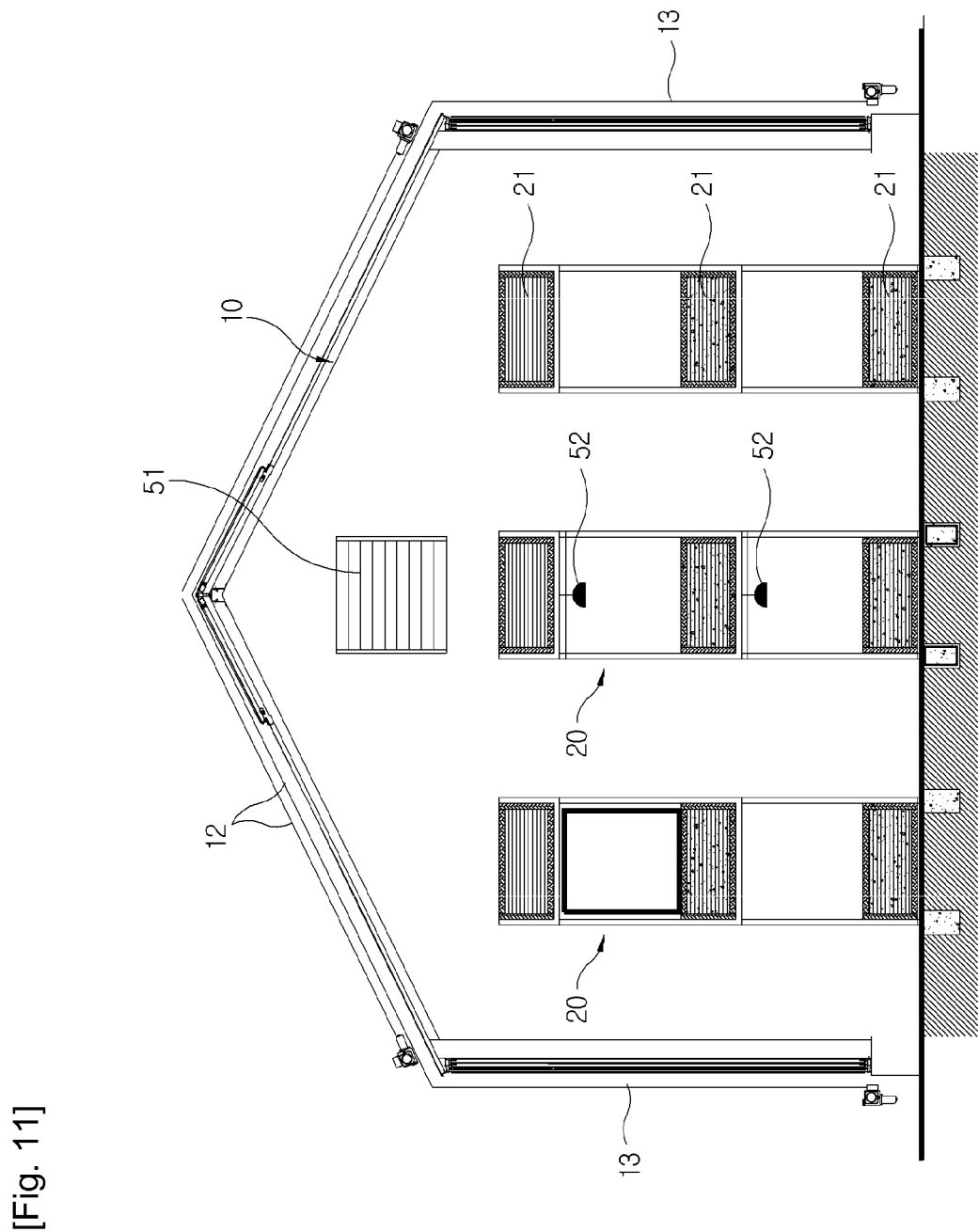
[Fig. 11]

CONTINUOUS CULTIVATION SYSTEM FOR ORGANIC GINSENG USING MULTILEVEL CULTIVATION TABLES

CROSS REFERENCE TO RELATED APPLICATIONS

This application is a National Stage of International Application No. PCT/KR2013/008351 filed Sep. 16, 2013, claiming priority based on Korean Patent Application No. 10-2012-0105150 filed Sep. 21, 2012, the contents of all of which are incorporated herein by reference in their entirety.

TECHNICAL FIELD

The present invention relates to a continuous cultivation system for organic ginseng using multiple cultivation tables (bed). More particularly, the present invention relates to a continuous cultivation system for organic ginseng using multilevel cultivation tables(bed), comprising a facility cable of continuously cultivating ginseng seedlings, young-root ginseng, and old-root ginseng in which: a multilevel cultivation table, including three or more levels(layer) of cultivation tables, is installed in a single-span or multi-span rainproof house; a perforated pipe for steam sterilization and drainage is installed on a surface of a bottom panel of each cultivation table; a bottom portion of each cultivation table up to the top surface of the perforated pipe is filled with perlite that is used as a drainage material; a drainage mesh is placed on the perlite; and remaining portions of the cultivation tables are filled with prepared gardening soil. The continuous cultivation system can sterilize the soil in the cultivation tables by supplying 80 to 95° C. steam to the gardening soil through the perforated pipe installed on the surface of a bottom panel of each cultivation table after harvesting ginseng, thereby eliminating adverse effects of repeated cultivation and thus enabling continuous cultivation of organic ginseng.

BACKGROUND ART

Ginseng, which is appreciated around the world, is known as Korea's representative farm produce and is a national product of which Koreans are proud. Korea is the country from which ginseng is thought to have originated and the country having a long history of cultivating ginseng. Furthermore, Korea has the world's best ginseng cultivation technologies developed over a long period. Ginseng cultivation technologies are closely related to the development of Korea's industry. As industrial technologies developed and progressed, ginseng farming technologies also developed. The formation of ridges and furrows in a ginseng field and work of transplanting seedlings have become mechanized; straw sun-shadings have been replaced by PE-based UV-coating sun-shading screens; wood bars for supporting sun-shadings have been replaced by durable iron bars; and rainproof cultivation facilities using plastic houses are now used.

In the rainproof cultivation house (including a greenhouse), the cultivation environment can be controlled. Thus, work management becomes easier compared to conventional field cultivation. In addition, since ginseng is cultivated in the rainproof environment, diseases such as anthrax rarely occur. Furthermore, since ginseng can be cultivated using eco-friendly organic materials, organic ginseng, which was difficult to produce in the past, can be produced now.

Korean Patent Application Publication Nos. 10-2002-0023081 and 10-2009-0091543 disclose technologies concerning the cultivation of ginseng. Korean Patent No. 10-1013778 also discloses one of the technologies.

The former ginseng cultivation apparatus increases a cultivation area by simply adopting multilevel cultivation tables, and the latter ginseng cultivation apparatus uses an artificial light source, a water supply facility, and a drainage facility for indoor cultivation and easy management in an indoor environment in which there is no sunlight.

DISCLOSURE

Technical Problem

Such conventional technologies of cultivating ginseng in a rainproof house or greenhouse have a problem in that it is difficult to perform repeated cultivation because fungi that cause ginseng root rot occur and reproduce in the soil during cultivation of ginseng in the case of both field cultivation and rainproof house cultivation. Such fungi make the roots of ginseng rot when the ginseng is repeatedly cultivated in the same soil (i.e., repeated cultivation is performed). Therefore, the utilization efficiency of facilities for the cultivation of ginseng is very low.

For such a reason, a method that can eliminate problems of repeated cultivation such as ginseng root rot by sterilizing soil (gardening soil) after cultivating ginseng, thereby enabling continuous cultivation of ginseng is highly demanded.

Accordingly, the present invention has been made keeping in mind the above problems occurring in the related art, and an object of the present invention is to provide a continuous cultivation system for organic ginseng using multilevel cultivation tables, the system including a facility in which a multilevel cultivation table, including three or more levels of cultivation tables, is installed, a perforated pipe for steam sterilization and drainage is installed on the surface of a bottom panel of each cultivation table, perlite serving as a drainage material is placed in each cultivation table to bury the perforated pipe, and the remaining portion of each cultivation table, which is on the perlite, is filled with prepared soil (gardening soil). With the use of the multilevel cultivation table, the system can improve utilization efficiency of facilities and enable easy cultivation of ginseng. In addition, the system can sterilize the soil on the cultivation tables by supplying high-temperature steam to the soil through the perforated pipe installed on the surface of a bottom panel of each cultivation table after harvesting ginseng, thereby eliminating adverse effects of repeated cultivation, enabling stable and continuous cultivation of ginseng.

Technical Solution

In order to accomplish the object, an aspect provides a continuous cultivation system for organic ginseng using multilevel cultivation tables, including: a facility having a predetermined shape, the facility including a rainproof plastic roof, a first sun-shading screen made of double-weave cloth that is placed on the rainproof plastic roof and allows transmission of an adequate amount of sunlight for cultivation of ginseng, and a second sun-shading screen made of double-weave cloth that is installed at front, back, and left, and right sides of the facility and that allows air to easily pass therethrough; a plurality of multilevel cultivation tables that includes three or more levels of cultivation tables each and are distanced from each other; a water supply device including a water tank installed on one side of the facility, a water supply pipe that extends from the water tank to each cultivation table via a pump, and drip irrigation pipes that are branched off from the water supply pipe to extend over each cultivation table; a ventilation window and an air blowing fan installed on the ceiling of the facility to ventilate an upper portion of the facility that is above the multilevel cultivation tables; and auxiliary light sources that are installed under all of the cultivation tables except for lowermost-level cultivation tables to illuminate underlying cultivation tables, respectively.

The roof of the facility may be an arc-shaped roof, a shed roof that is inclined in one direction from a top end to a bottom end, or a gable roof that is inclined in two opposite directions from the center to respective ends; and the facility may be a single-span facility with a single roof or a multi-span facility with multiple roofs connected to each other.

The water supply pipe is provided with first valves that control supply of water to each multilevel cultivation table and second valves that control supply of water from each multilevel cultivation table to each cultivation table; and each cultivation table is provided with a tension meter so that the first and second valves are opened or closed according to signals detected by the tension meters so that water can be supplied only to a predetermined multilevel cultivation table among the multilevel cultivation tables.

In the continuous cultivation system for organic ginseng using multilevel cultivation tables according to the present aspect, each multilevel cultivation table includes three or more levels of cultivation tables, each of which has a rectangular-parallelepiped shape, is provided with the perforated pipe for steam sterilization and drainage that extends in a longitudinal direction on the inside bottom thereof, is provided with the perlite that serves as a drainage material and is placed therein to bury the perforated pipe, and is filled with the soil (gardening soil) that is placed on the perlite for ginseng cultivation.

The outer surface of the perforated pipe is preferably wrapped with a non-woven fabric to enable smooth drainage of water and to prevent soil loss, and a drainage mesh is preferably interposed between the perlite and the soil to prevent the soil from being mixed with the perlite.

The multilevel cultivation tables may be prepared using sandwich panels and a distance between adjacent cultivation tables (upper and lower cultivation tables) is 50 cm when the cultivation tables are used for cultivation of seedlings or young-root ginseng. In these multilevel cultivation tables, a bottom panel of each cultivation table has a width of 100 cm, and walls standing at the edges of the bottom panel have a height of 35±5 cm from the upper surface of the bottom panel.

In addition, the multilevel cultivation tables may be prepared using sandwich panels and the distance between adjacent cultivation tables (upper and lower cultivation tables) may be 1 m when the cultivation tables are used for cultivation of old-root ginseng. In these multilevel cultivation tables, a bottom panel of each cultivation table has a width of 1 m and walls standing at the edges of the bottom panel have a height of 50 cm from the upper surface of the bottom panel.

The perforated pipe is preferably installed to be inclined at an inclination angle of 1 to 5° from one end to the other to cause water to flow in one direction and to collect in a water-collecting well. When the inclination angle is 1° or smaller, water that is introduced from outside cannot smoothly flow. On the other hand, when the inclination angle is 5° or larger, as the length of the cultivation table is increased, a height difference between respective ends of the perforated pipe is also increased. In this case, there is a problem that the thickness of the perlite that covers the perforated pipe has to be increased and the height of the walls of the cultivation tables also have to be increased.

Advantageous Effects

As described above, according to an aspect of the present invention, the perforated pipe for steam sterilization and drainage is installed on the surfaces of bottom panels of the multilevel cultivation tables, the cultivation tables are filled with the perlite serving as a drainage material to the extent that the perforated pipe is buried, remaining portions of the cultivation tables on the perlite are filled with soil, and each of the multilevel cultivation tables includes three or more levels of cultivation tables. Because of the use of three or more levels of cultivation tables structured in the way described above, ginseng can be easily cultivated and utilization efficiency of cultivation facilities is increased. In addition, after ginseng is harvested, the soil in the cultivation tables can be sterilized by supplying high-temperature steam to the soil through the perforated pipe installed on the surfaces of the bottom panels of the multilevel cultivation tables, eliminating adverse effects of repeated cultivation, thereby enabling continuous cultivation.

DESCRIPTION OF DRAWINGS

FIG. 1 is a schematic diagram illustrating a continuous cultivation system for organic ginseng using multilevel cultivation tables according to one embodiment of the present invention;

FIG. 2 is a front view of the system of FIG. 1;

FIG. 3 is a plan view that schematically illustrates the continuous cultivation system for organic ginseng of FIG. 1;

FIG. 4 is a view illustrating a state in which a water supply device is connected to each of multilevel cultivation tables shown in FIG. 3;

FIG. 5 is a plan view illustrating arrangement of an air blowing fan in the continuous cultivation system for organic ginseng according to the embodiment of the present invention;

FIG. 6 is a plan view illustrating arrangement of auxiliary light sources in the continuous cultivation system for organic ginseng according to the embodiment of the present invention;

FIG. 7 is a perspective view illustrating a multilevel cultivation table that is a main part of the continuous cultivation system for organic ginseng according to the embodiment of the present invention;

FIG. 8 is a sectional view taken along a widthwise direction of the multilevel cultivation table of FIG. 7;

FIG. 9 is a sectional view taken along a lengthwise direction of the multilevel cultivation table of FIG. 7; and FIGS. 10 and 11 are views illustrating a facility according to another embodiment of the present invention.

BEST MODE

Hereinafter, a continuous cultivation system for organic ginseng using multilevel cultivation tables according to preferred embodiments of the present invention will be described with reference to the accompanying drawings.

As illustrated in FIGS. 1 to 7, a continuous cultivation system for organic ginseng using multilevel cultivation tables according to one embodiment of the present invention includes a facility 10 having a predetermined shape and a plurality of multilevel cultivation tables 20 arranged in the facility 10. The term "cultivation of organic ginseng" includes "cultivation of seedlings," "cultivation of young-root (3-year old or younger) ginseng," and "cultivation of old-root (4-year old or older) ginseng."

The facility 10 may be a single-span or multi-span rainproof house. The facility 10 is built with facility frames 15 having a predetermined shape, and a roof is placed on the top of the facility frames 15. The illustrated facility 10 is only an example. The facility 10 has a convex top. That is, three outward curved (arc-curved) roofs in which the center is highest and respective ends are lowest are connected to each other, forming a multi-span rainproof house.

The facility 10 may be a single-span rainproof house with an arc-curved roof as illustrated in FIG. 10 as well as a multi-span rainproof house with multiple arc-curved roofs. The roof of the facility 10 may be a gable roof that is inclined in two opposite directions from the center to respective ends or a shed roof that is inclined in one direction from a top end to a bottom end.

A vinyl sheet 11 as a rainproof material is placed on the roof of the facility 10, and a first sun-shading screen 12 formed of double-weave cloth is installed thereon to transmit an adequate amount of sunlight for the growth of ginseng. In addition, front, back, right, and left sides of the facility 10 are surrounded by a second sun-shading screen 13 formed of double-weave cloth but not by a vinyl sheet so that air can smoothly flow in and out of the facility 10.

The second sun-shading screen 13 is suitably made of only a single layer of blue double-weave cloth, but the first sun-shading screen 12 on the roof of the facility 10 may be preferably a double layer of blue double-weave cloth and black double-weave cloth so that only a suitable amount of sunlight for the growth of ginseng can pass through. In this case, the first sun-shading screen 12 is made of the black double-weave cloth and the second sun-shading screen 13 can be opened and closed using respective switches.

Gates 14 also may be formed in the front and back sides of the facility 10 so that workers can enter the facility 10.

The structure of the facility 10 may be applied to a standard glass greenhouse as illustrated in FIG. 11. In this case, the glass greenhouse is equipped with the first and second sun-shading screens 12 and 13 and has windows on the rooftop and at the left and right sides of the facility 10 for the purpose of easy ventilation.

The multilevel cultivation tables 20 are arranged to extend in a longitudinal direction of the facility 10 and are distanced from each other at regular intervals in a widthwise direction. Each multilevel cultivation table 20 includes three or more levels of cultivation tables. The distance of a passage between the multilevel cultivation tables 20 is set such that workers can pass between the multilevel cultivation tables and perform their job while standing in the passage.

The multilevel cultivation tables 20 are built with sandwich panels regardless of purposes, i.e., cultivation of seedlings, cultivation of young-root ginseng, and cultivation of old-root ginseng. When the multilevel cultivation tables 20 are used for cultivation of seedlings and young-root ginseng, a distance between adjacent cultivation tables (upper and lower cultivation tables) may be 50 cm to be suitable for cultivation of seedlings and young-root ginseng, the width of the bottom panel of the cultivation table may be 100 cm, and the height of walls standing at the edges of the bottom panel may be 35±5 cm from the upper surface of the bottom panel.

When the multilevel cultivation tables 20 are used for cultivation of old-root ginseng, the distance between upper and lower cultivation tables may be 1 m to be suitable for cultivation of old-root ginseng, the width of the bottom panel may be 100 cm, and the height of walls standing at the edges of the bottom panel may be 50 cm from the upper surface of the bottom panel.

Support frames of the multilevel cultivation tables 21 are assembled with circular or rectangular rods. Within one multilevel cultivation table, three levels of cultivation tables 21 are arranged in a vertical direction and supported by the support frames 22. Each cultivation table of the multilevel cultivable table has a rectangular-parallelepiped shape with an open top. On the surface of the bottom panel of each cultivation table 21, a perforated pipe 23 for steam sterilization and water drainage is arranged to extend in a longitudinal direction. In each cultivation table 21, perlite serving as a drainage material is placed to bury the perforated pipe 23. The remaining portion of each cultivation table 21 is filled with soil (gardening soil) 25 that has a predetermined thickness. A vinyl sheet may be placed in the cultivation table 21 for waterproofing purposes.

The outer surface of the perforated pipe 23 is preferably wrapped with a non-woven fabric 26 that enables easy water drainage and prevents soil loss. In addition, a drainage mesh 27 is preferably interposed between the perlite 24 and the soil 25 to prevent the soil 25 from being mixed with the perlite 24.

The perforated pipe 23 is installed to be inclined at an inclination angle from one end to the other. The lower end of the perforated pipe 23 is connected to a drainage pipe 31 that leads to a water-collecting well 30, in a detachable manner. The higher end of the perforated pipe 23 is closed with a plug. The intension of the inclined arrangement of the perforated pipe 23 is to enable water, which is to be supplied to the soil serving as a cultivation bed 21, to be easily supplied to the soil through pores of the perforated pipe 23 and to flow to the lower side so that the water can be collected in the water-collecting well 30. In addition, after ginseng is harvested, one end of the perforated pipe 23 is closed and the other end of the perforated pipe 23 is connected to a steam discharge pipe of a steam sterilization system (not shown) so that 80-95° C. steam can be supplied to the perforated pipe 23 to sterilize the soil in the cultivation table 21.

The inclination angle of the perforated pipe 23 is set such that the water introduced into the perforated pipe 23 can flow down. The inclination angle is preferably 1 to 5° at either end of the perforated pipe 23. When the inclination angle of the perforated pipe 23 is 1° or smaller, water introduced into the perforated pipe 23 cannot easily flow down. On the other hand, when the inclination angle of the perforated pipe 23 is 5° or larger, the height difference between the respective ends of the perforated pipe 23 is increased as the length of the cultivation table is increased. Therefore, the amount of perlite to bury the perforated pipe is increased, and the height of the walls of the cultivation table is also increased.

Although the example in which the perforated pipe 23 is installed to be inclined at a predetermined inclination angle has been described above, a different arrangement is also possible. That is, the cultivatable table 21 itself may be inclined or only the bottom panel of the cultivation table may be inclined.

The soil (gardening soil) for cultivation of ginseng may be a material certified for organic products. The soil may be perlite 24, vermiculite, or peat-moss all of which are usually used as nursery bed soil. The soil may be virgin soil or organic fertilizer(compost) (ginseng cultivation-dedicated fertilizer(compost)) used for cultivation of ginseng seedlings.

The perlite 24 is white porous particles prepared by pulverizing crude perlite rocks and performing a high-temperature foaming process on the particles of the pulverized crude perlite rocks. The perlite 24 is a versatile material used as filter, heat-resistant material, filler, etc. in various industries. The perlite is light, having a bulk density of 0.12 g/cm$^3$, and has good water permeability. Therefore, it is commonly used as a soil conditioner or a nursery bed soil. Concerning vermiculite, when vermiculite is heated to a high temperature (950° C.), it expands to become porous. So, it is a material having a high cation exchange capacity. Vermiculite is also light and has a bulk density of 0.17 g/cm$^3$, so it is used as a heat-resistant material or a sound-insulating material in various industrial fields in addition to being used in the agricultural field. Peat-moss is a deposit of mosses in lakes. Although it has a low acidity, for example, pH 4 to 5, it is commonly used as a material for pot culture after it undergoes pH calibration because it has good physical properties suitable for nursery bed soil. Virgin soil is decomposed granite collected from forests and originates from rocks. Therefore virgin soil is not said to be a safe material that is immune from pathogenic bacteria. The organic fertilizer(compost) is prepared by collecting green leaves of oak trees and fertilizing the collected leaves. It has long been used as a material that supplies nutrition to soil for the purpose of improving the yield of ginseng seedlings.

The material composition of gardening soil (soil, 25) for cultivation of ginseng includes virgin soil, organic fertilizer (compost), peat-moss, perlite, and vermiculite mixed in predetermined mixture ratios. According to the mixture ratio, the gardening soil may be used for seedling production or ginseng cultivation. In the gardening soil for seedling production, the ratio of the organic fertilizer that is a main nutrition source to ginseng is preferably increased by 5 to 10 percents compared to that in the gardening soil for ginseng cultivation. The reason of using the gardening soil for ginseng cultivation is that the gardening soil is an artificial soil having physical and chemical properties suitable for ginseng cultivation in multilevel cultivation tables. That is, prepared gardening soil is lighter in bulk density than general soil by 20 to 30 percents, effectively reducing the load applied to the multilevel cultivation tables 20.

The facility 10 is equipped with a water supply device that supplies water to the multilevel cultivation tables 20. The water supply device includes a water tank 40 installed on one side of the facility 10, a water supply pipe 32 that extends from the water tank 40 to each multilevel cultivation table 20 via a pump 41, and drip irrigation pipes 43 that are branched off from the water supply pipe 42 and extend over each cultivation table 21.

The water supply pipe 42 is equipped with first valves 42a that control supply of water to the respective multilevel cultivation table 20 and second valves 43b that control supply of water to every cultivation table 21 within one multilevel cultivation table 20. Each cultivation table 21 is equipped with a tension meter. The first and second valves 42a and 42b on the water supply pipe 42 that control supply of water to a predetermined multilevel cultivation table 20 and a predetermined cultivation table 21 are opened according to a signal detected by the tension meter so that water can be supplied only to the predetermined multilevel cultivation table 20 and the predetermined cultivation table 21.

One end of the perforated pipe 23 installed on the inside bottom surface of the cultivation table 21 of the multilevel cultivation table 20 is connected to the drainage pipe 31, and the drainage pipe 31 extends to the water-collecting well 30 installed on another side of the facility 10.

An air blowing fan 50 that blows air or ventilates an upper portion of the multilevel cultivation table 20 is installed on the ceiling of the facility 10. Ventilation window 51 may be installed in the roof, the front side, or the back side of the facility 10. Auxiliary light sources 52 are installed under each cultivation table 21 except for the lowermost cultivation table 21. That is, the auxiliary light sources are installed under second-level and third-level cultivation tables 21, within the multilevel cultivation tables 20 except for outermost cultivation tables 20 that are located near the edges of the facility 10. The auxiliary light sources 52 intensively illuminate respective underlying cultivation tables 21 located thereunder. The auxiliary light sources 52 supplement the insufficient amount of sunlight for a first-level (lowermost) cultivation table 21 and the second-level (middle) cultivation table 21 except for the third-level (uppermost) cultivation table 21.

Hereinafter, a process of continuously cultivating organic ginseng using the multilevel cultivation tables within the facility in which the multilevel cultivation tables are installed according to one embodiment will be described below.

1) Description of a Process of Producing Ginseng Seedlings

Sowing of ginseng seeds for producing ginseng seedlings is performed by putting nursery bed soil for production of ginseng seedlings into the cultivation tables 21 of the multilevel cultivation tables 20 and sowing seeds in November, which is the usual seedtime for field cultivation. After making sowing holes using a long rod in the same manner as the way of making sowing holes in typical nursery lands, dehisced seeds are put into the sowing holes, then primarily covered with surrounding gardening soil, and finally covered with a 1 cm layer of sieved sand. After the seeds are covered with sand, water is sufficiently sprinkled on the gardening soil. Next, a vinyl sheet is placed on the gardening soil and sand to prevent evaporation of water during winter.

The vinyl sheet is managed not to be uncovered during winter. Next, drip irrigation pipes 43 are uniformly installed over the cultivation tables 21 of each multilevel cultivation table 20 after the winter season ends and before sprouting starts in early March. In this way, moisture management is performed during growth and development of ginseng seedlings.

After ginseng seedlings are transplanted, the surrounding soil is covered with sand to a thickness of 1 cm. The sand presses the upper surface of the gardening soil, enhancing capillary action in the gardening soil, thereby reducing evaporation of water from the surface of the gardening soil.

Since there is a temperature difference of 2° to 3° C. between the third-level (uppermost) cultivation table and the first-level (lowermost) cultivation table within a multilevel cultivation table, evapotranspiration rates in the third and first cultivation tables are different. For this reason, the moisture state of the gardening soil has to be periodically monitored and managed.

Moisture management may be performed manually. Alternatively, the moisture management may be performed automatically and precisely by installing a tension meter. Since the gardening soil prepared for production of ginseng seedlings has different physical properties from field soil, a suitable moisture rate can be maintained by managing irrigation timing. The suitable irrigation timing is managed to be about 25 kPa using the tension meter.

The moisture management is performed in the following manner: the pump 41 is started to operate in response to the signals output from the tension meters installed in the cultivation tables 21, and the first and second valves 42a and 42b on the water supply pipe 42 are opened so that water in the water tank 40 can be supplied to all of the multilevel cultivation tables or only to a predetermined cultivation table 21 among cultivation tables 21 within a predetermined multilevel cultivation table 20. When water is supplied to a multilevel cultivation table 20 or a cultivation table 21, the water permeates into the perforated pipe 23 installed under the soil, and the water having permeated into the perforated pipe 23 is collected in the water-collecting well 30 via the drainage pipe 31.

During summer, the temperature of air in the third-level (uppermost) cultivation table has to be carefully managed. Since the ambient temperature in the third-level cultivation table is higher, the evapotranspiration rate in the third-level cultivation table is also higher compared to that in the other cultivation tables located thereunder. Therefore, the growth rates may not be uniform among the cultivation tables. Thus, a measure of lowering the temperature of the uppermost cultivation table is taken by covering the third-level (uppermost) cultivation table 21 with a non-woven fabric or a blue double-weave sun-shading screen in addition to the first sun-shading screen 12 placed on the outer surface of the facility 10.

When the internal temperature of the upper portion of the facility 10 is 30° C. or higher even such the measure is taken, the air blowing fan 50 installed on the ceiling of the facility 10 is started to operate or the ventilation windows 51 are opened so that the ginseng seedlings would not be negatively affected by the hot temperature.

The ginseng seedlings are transplanted into a permanent field in early November. At this point, organic fertilizer (compost) is added to the gardening soil in the cultivation tables 21 of the multilevel cultivation tables 20 by 5 percents by weight and seeds are sowed in the gardening soil again. The gardening soil for production of ginseng seedlings is used about two times. After that, the gardening soil is sterilized to be reused by connecting the steam discharge pipe of the steam sterilization system to respective ends of the perforated pipe 23 and supplying hot steam (80 to 95° C.), or is replaced with new gardening soil.

2) Description about Cultivation Process of Young-root (Three-year or Younger) Ginseng and Old-root (Four-year or Older) Ginseng First, gardening soil for production of young-root ginseng is put into all of the cultivation tables 21 of each multilevel cultivation table 20 and then leveled. Ginseng seedlings are transplanted into the cultivation tables 21 in the same manner as performed in fields. In this case, the method of transplanting ginseng seedlings includes making holes that are tapered with an inclination of 45° using a long rod (sowing board), putting ginseng seedlings into the holes, and performing soil-covering. The density of ginseng seedlings for young-root ginseng production is 150 to 300 seedlings per patch (1.62 m$^2$), and the density of ginseng seedlings for old-root ginseng production is 63 to 120 seedlings per patch (1.62 m$^2$).

After the transplantation of seedlings is completed, the seedlings are covered with sand to a thickness of 1 cm. The sand covering presses the surface of soil, enhancing capillary action in gardening soil, thereby reducing evaporation of water from the surface of the gardening soil.

After the transplantation of seedlings, the drip irrigation pipes 43 that are branched off from the water supply pipe 42 are installed to be uniformly arranged over the cultivation tables 21 of the multilevel cultivation table 20 for the purpose of moisture management. In this case, as the distance between the drip irrigation pipes 43 is decreased, water can more uniformly permeate into the soil and moisture management becomes easier. The suitable distance may be 10 cm. The use of the tension meter also makes the moisture management easier as it makes the management of ginseng seedlings easier. Even in summer when an evapotranspiration rate is high, it is not preferable to sprinkle a large amount of water at a time. The target amount of water is preferably sprinkled over two to three times while confirming the moisture state so as not to cause excess moisture conditions.

Moisture management is performed in the following manner: the pump 41 is started to operate in response to signals output from the tension meters; and the first and second valves 42a and 42b on the water supply pipe 42 are opened so that water in the water tank 40 can be supplied to all of the multilevel cultivation tables 20 or only to a predetermined cultivation table 21 among cultivation tables 21 within a predetermined multilevel cultivation table 20. When water is supplied to the multilevel cultivation table 20 or the cultivation table 21, the water permeates into the perforated pipe buried under the soil, and the water in the perforated pipe is collected in the water-collecting well 30 via the drainage pipe 31.

Concerning harvesting of young-root ginseng, 2-year root ginseng is produced by transplanting seedlings in early March, and harvested in the middle ten days of September when the leaves and stems are alive and roots are fat and have a proper rigidity. For 3-year root ginseng, when it is necessary to use leaves, both the roots and leaves are harvested in the middle ten days of September. When only roots are needed as ingredients for Samgyetang (ginseng chicken soup) or the like, the harvesting time will be postponed to middle or latter 10 days of October.

The harvested ginseng roots are used as ingredients of Samgyetang (ginseng chicken soup), cosmetics, medicines, health supplements, etc. The harvested ginseng leaves may be used as functional leafy vegetables for Ssam, a material for ginseng leaf tea, etc. Both of the leaves and roots may be used as ingredients for salad.

The harvested old-root ginseng can be used as fresh ginseng or red ginseng like ginseng roots cultivated in the field. Since the ginseng is cultivated without use of chemical pesticides or chemical fertilizers, desirable safe ginseng roots and leaves can be obtained.

INDUSTRIAL APPLICABILITY

The continuous cultivation system for organic ginseng using multilevel cultivation tables according to the present invention can be suitably used as a vegetable factory-type cultivation system that cultivates vegetables while artificially controlling soil quality and the cultivation environment in a facility such as a glass greenhouse, or a single-span or multi-span plastic house.

The invention claimed is:
1. A continuous cultivation system for growing organic ginseng using multilevel cultivation tables, the system comprising:

a facility that is a plastic house or greenhouse, the facility including
    a rainproof plastic roof,
    a first sun-shading screen made of double-weave cloth that is placed on the rainproof plastic roof, and
    a second sun-shading screen made of double-weave cloth that is installed at front, back, left, and right sides of the facility;
a plurality of multilevel cultivation table sets placed within the facility, wherein each of the multilevel cultivation table sets includes three or more levels of cultivation tables and wherein the individual tables of the table sets are distanced from each other;
a water supply device including
    a water tank,
    a water supply pipe that extends from the water tank to reach each cultivation table to supply water, and
    drip irrigation pipes that are branched off from the water supply pipe to extend over each cultivation table; and
auxiliary light sources that are installed under all of the cultivation tables except for lowermost cultivation tables and that illuminate their underlying cultivation tables, respectively,
wherein each multilevel cultivation table set is a rectangular-parallelepiped body and includes three or more levels of cultivation tables that are supported on a single support frame,
each cultivation table is equipped with a perforated pipe for steam sterilization and water drainage, the perforated pipe extending in a longitudinal direction of the cultivation table and being installed to be inclined at an angle of 1 to 5° from one end on a floor of the cultivation table,
an outer surface of the perforated pipe is wrapped with a non-woven fabric that enables drainage and prevents soil loss,
perlite placed in each cultivation table to bury perforated pipe,
soil for ginseng cultivation that is placed on the perlite, and
a drainage mesh interposed between the soil and the perlite to prevent the soil from being mixed with the perlite.

2. The continuous cultivation system according to claim 1, wherein:
    each of the cultivation tables is built with a panel;
    a distance between adjacent cultivation tables in a vertical direction is 50 cm to be suitable for cultivation of ginseng seedlings;
    a width of the panel of each cultivation table is 100 cm; and
    a height of walls standing at edges of the bottom panel from an upper surface of the bottom panel is 35±5 cm.

3. The continuous cultivation system according to claim 1, wherein:
    each of the multilevel cultivation tables is built with a panel;
    a distance between adjacent cultivation tables in a vertical direction is 1 m to be suitable for cultivation of young-root ginseng or old-root ginseng;
    a width of the panel of each cultivation table is 1 m; and
    a height of walls standing at edges of the bottom panel from an upper surface of the bottom panel is 50 cm.

4. The continuous cultivation system of claim 1, which further comprises
    a ventilation window and an air blowing fan installed beneath the rainproof plastic roof to ventilate an upper portion of the facility that is above uppermost cultivation tables of the multilevel cultivation table sets.

* * * * *